United States Patent [19]
Kingsly

[11] 3,865,401
[45] Feb. 11, 1975

[54] DUAL BICYCLE COUPLING KIT

[76] Inventor: Walter D. Kingsly, 806 Lawn Ridge S.E., Huron, S. Dak. 57350

[22] Filed: May 16, 1974

[21] Appl. No.: 470,693

[52] U.S. Cl. ............................................. 280/209
[51] Int. Cl. ........................................... B62k 13/06
[58] Field of Search .......... 280/209, 231, 232, 222, 280/224, 7.16; 74/594.4, 594.6

[56] References Cited
UNITED STATES PATENTS

| | | | |
|---|---|---|---|
| 391,895 | 10/1888 | Hall | 280/231 |
| 599,859 | 3/1898 | McFadden | 280/7.16 |
| 3,350,115 | 10/1967 | Ferrary | 280/209 |
| 3,592,486 | 7/1971 | Fox | 280/209 |
| 3,768,834 | 10/1973 | Singleton | 280/209 |

Primary Examiner—Leo Friaglia
Assistant Examiner—R. Schrecengost
Attorney, Agent, or Firm—Robert K. Rhea

[57] ABSTRACT

A plurality of elongated longitudinally adjustable rod-like connectors are provided with means at their respective ends for extending between and connecting the frame, handlebar stems and adjacent pedals of two bicycles in side-by-side relation for dual operation of the bicycles.

4 Claims, 6 Drawing Figures

PATENTED FEB 1 1 1975  3,865,401

DUAL BICYCLE COUPLING KIT

BACKGROUND OF THE INVENTION

1. Field of the invention.

The present invention relates to a device for coupling two bicycles together in side-by-side relation for simultaneous operation and more particularly to coupling members permitting the two bicycles to be operated as a unit and preserve the feel and ride quality of an uncoupled single bicycle.

For the side-by-side companionship some cyclists desire to connect bicycles in a dual arrangement so that the two bicycles operate as a single unit.

2. Description of the prior art.

Various devices have been proposed for connecting two bicycles in side-by-side relationship. Such prior art devices have not been entirely satisfactory for the reason that they usually employ rigid members rigidly connecting the bicycle frames so that the two bicycles form a unitary four-wheel vehicle. When coupled bicycles having rigid connections are operated over irregular surfaces they are restrained from movement relative to each other and consequently undesirable forces are generated and applied to the respective bicycle frame. Similarly, when executing a turn the rigidly connected bicycles must remain upright rather than leaning into the turn thus eliminating the riding qualities of a singly operated bicycle. In an attempt to overcome the objectionable features of rigidly coupled bicycles spring member coupling devices have also been proposed, however, the spring member coupling devices tend to introduce a degree of instability to the coupled bicycles. U.S. Pat. Nos. 3,175,843 and 3,350,115 are examples of dual bicycle connectors.

SUMMARY OF THE INVENTION

Basically this invention comprises a plurality of rigid longitudinally adjustable rod-like members which extend between and are connected at their respective ends with two bicycles. Two of the connectors are provided with clamp members at their respective ends for respectively connecting the chain stay of one bicycle with the chain stay of the other bicycle while the other similar connector joins the top tubes of the bicycles adjacent the steering head. Another connector, provided with sleeve-like bearings at its respective ends, is pivotally connected with a horizontal stem forming a part of a clamp secured to the seat tube of each bicycle adjacent the top tube. A steering connector, similarly having sleeve bearings at its respective ends, joins the upstanding leg portions of a pair of clamps secured to the handlebar stems of each bicycle for turning the wheels of the bicycles in unison. A pedal connector is provided with U-shaped sockets hingedly connected with its respective ends which envelopes the adjacent pedals of the two bicyles for maintaining a constant rate of travel of both bicycles.

The principal object of this invention is to provide connectors for coupling two bicycles in side-by-side relation which permit the bicycles to be operated as a unit while preserving, to a substantial degree, the ride and feel of uncoupled individually operated bicycles.

DESCRIPTION OF THE PREFERRED EMBODIMENTS

Figure 1:
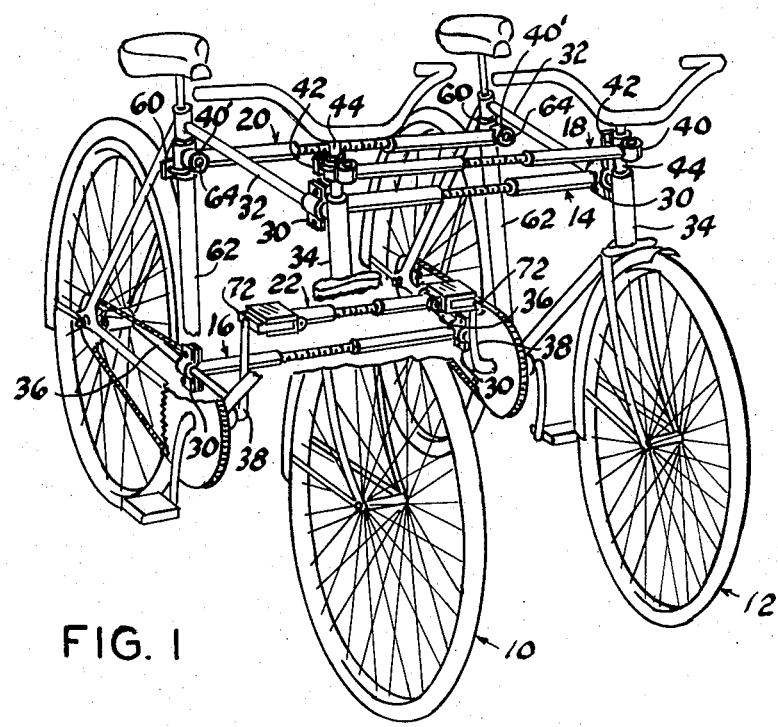
FIG. 1 is a perspective view illustrating the coupling members connecting two bicycles in side-by-side relation with portions of the bicycles broken away for clarity.

Like characters of reference designate like parts in those figures of the drawings in which they occur.

In the drawings:

The reference numerals 10 and 12 generally indicate two conventional boy's bicycles disposed in side-by-side upright relation to form a coupled unit. The connector members comprise a top tube connector 14, a chain stay connector 16, a steering connector 18, a seat tube connector 20, and a pedal connector 22. Each of the connectors 16 through 22 include tubular internally threaded end portions 24 and 26 threadedly engaged with a threaded shaft 28 thus permitting the tube ends 24 and 26 to be adjusted toward and away from each other to dispose the bicycles 10 and 12 a selected distance apart, it being understood that the overall length of the respective connector being adjusted, to be substantially equal with each other between their respective points of connection, as presently described.

The connectors 14 and 16 are substantially identical, each having a bolt secured split clamp 30 at its respective ends. The top tube connector clamps 30 respectively surround the top tube 32 of each bicycle adjacent the steering head 34. The clamps 30 of the chain stay connector 16 respectively surround one chain stay 36 of each bicycle intermediate the ends of the chain stay and spaced rearwardly of the crank arms 38 a distance permitting rotation of the latter. Each of the clamps 30 are rigidly connected to the respective connector end portion 24 and 26 but permit rotation of the respective seat tube 32 and chain stay 36 within the clamp to permit leaning of the bicycles in unison as when negotiating a turn, or the like. Transversely the width of each clamp 30 is such that it is substantially greater than the diameter of the top tube 32 or chain stay 36 to prevent one bicycle progressing ahead of the other.

Figure 2:
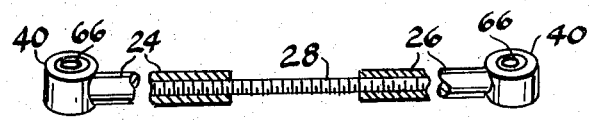
FIG. 2 is a fragmentary perspective view, to a larger scale, partially in section, of one of the coupling members.
Figure 3:
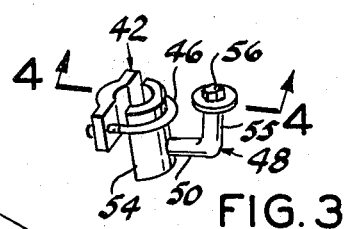
FIG. 3 is a perspective view, to a similarly enlarged scale, of the handlebar stem connector mounting clamp.

The steering connector 18 is provided with cylindrical sleeves 40 rigidly connected with its respective ends with the axis of each sleeve normal to the axis of the threaded shaft 28 (FIG. 2). A split clamp 42 surrounds the handlebar stem 44 of each bicycle and is rigidly secured thereto by a U-bolt 46. An L-shaped shaft 48 has one of its leg members 50 horizontally disposed and provided with a flange 52 for pivotal connection with one-half 54 of the clamp 42 thus disposing the other leg 55 of the shaft vertically and permitting vertical pivoting movement of the leg 55 about the horizontal axis of the leg 50. The sleeves 40 are respectively journalled by the shaft legs 55 and held thereon by stud bolt and washer means 56 threadedly engaged with the shaft leg 55, thus permitting the front wheels of the bicycles to be turned in unison by rotation of the shaft legs 55 within the respective sleeve 40 and similarly permitting tilting of the bicycles in the same direction by the pivotal connection of the shaft legs 50.

Similar split clamps 60 are connected with the respective bicycle seat tube 62 adjacent the top tube 32. The seat tube clamps 60 are each provided with a stem 64 projecting horizontally forward with respect to the seat tube 62. The seat tube connector 20 is provided with a pair of similar sleeves 40' which respectively surround the seat tube clamp stem 64 and are secured thereon by similar bolt and washer means, thus interconnecting the top and rearward portion of the bicycle frames while permitting tilting of both bicycles in the same direction. Each of the sleeves 40 and 40' may be provided with bearings 66 to reduce friction. Obviously the sleeves 40 and 40' may be hingedly connected with the respective threaded tube end portions 24 and 26, if desired.

Figure 5:
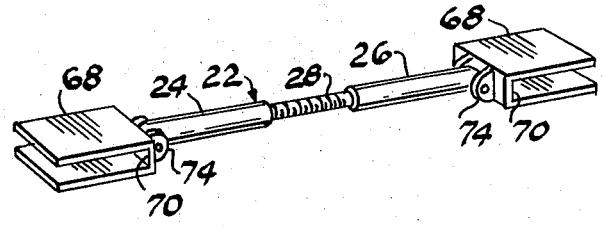
FIG. 5 is a perspective view of the seat pedal connector.

As illustrated in FIG. 5, the pedal connector tube 22 is provided with substantially U-shaped members 68 forming a socket 70 cooperatively receiving, in gripping relation, adjacent pedals 72 of the two bicycles. Each of the socket members 68 are hingedly connected, as at 74, to the respective threaded tube 24 and 26.

Figure 6:
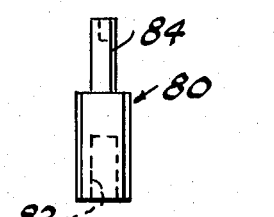
FIG. 6 is a side elevational view of a handlebar stem clamp extension.
Figure 4:
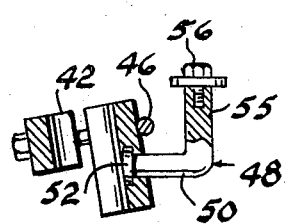
FIG. 4 is a vertical cross sectional view, partially in elevation, taken substantially along the line 4—4 of FIG. 3.

Alternatively a handlebar stem clamp extension 80 (FIG. 6), having coaxial socket 82 and stem portions 84, may be connected with one of the L-shaped shaft leg portions 55 to dispose the handlebar stem connector 14 substantially horizontal when coupling unequal size bicycles together.

OPERATION

In operation the respective connectors 14 through 22 are adjusted and connected with the bicycles 10 and 14, as disclosed hereinabove. The handlebar stem connector 18 thus permits the front wheels to be steered in unison and the pedal connector 22 maintains a constant rate of rotation of the bicycle rear wheels when the bicycles are of equal size. In the event one bicycle is smaller than the other the side-by-side relationship is maintained wherein the larger diameter bicycle wheels drive the smaller bicycle at a faster rate. Similarly the pivotal connections of the respective connectors permit a larger bicycle to be connected to the frame of a smaller bicycle.

While boy's type bicycles have been illustrated it seems obvious that the connectors will work equally well on similar components of girl's type bicycles or that a boy's bicycle and a girl's bicycle may be joined in side-by-side relation.

Obviously the invention is susceptible to changes or alterations without defeating its practicability, therefore, I do not wish to be confined to the preferred embodiment shown in the drawings and described herein.

I claim:

1. Apparatus for coupling two bicycles, each having a frame including a seat tube, pedals and a handlebar stem for simultaneous operation in spaced side-by-side relation, comprising:

at least one rigid longitudinally adjustable frame connector having clamp means at its respective ends adapted to extend between and be connected with a normally horizontal portion of the respective bicycle frame;

a seat tube bracket adapted to be connected with the seat tube of each bicycle, said seat tube brackets each having a forwardly projecting normally horizontally disposed rod portion;

a rigid longitudinally adjustable seat tube connector having a sleeve bearing transversely connected with its respective ends for surrounding the respective said horizontal rod portion;

steering connector means adapted to interconnect the handlebar stems of said bicycles for simultaneously angular displacement of the front wheels whereby said bicycles are constrained to turn in unison; and, a longitudinally adjustable pedal connector having a U-shaped member connected with its respective ends adapted to receive a pedal of each said bicycle when the pedals are disposed in aligned opposition for maintaining the angular rotation of the bicycle wheels constant with respect to each other whereby said bicycles are restrained from advancing or receding relative to each other.

2. The apparatus according to claim 1 in which said steering connector means includes:

a split clamp surrounding the respective said handlebar stem; and, an L-shaped shaft pivotally connected, at one end portion, with one portion of said split clamp for vertical pivoting movement of the other end portion of said L-shaped shaft about a horizontal axis.

3. The apparatus according to claim 2 in which said connectors each include internally threaded tubular end portions, and a threaded shaft extending between and connected with the respective tubular end portion.

4. The apparatus according to claim 3 in which the U-shaped members of said pedal connector are hingedly connected with the respective tubular end portion of said pedal connector.

* * * * *